United States Patent Office 2,917,366
Patented Dec. 15, 1959

2,917,366
PRODUCTION OF HIGH ACTIVITY ALUMINA

Rowland C. Hansford, Fullerton, Calif., assignor to Union Oil Company of California, Los Angeles, Calif., a corporation of California No Drawing. Application December 3, 1956
Serial No. 625,601

6 Claims. (Cl. 23—143)

This invention relates to the production of high surface area aluminas suitable for use as adsorbents, catalysts, catalyst carriers, and the like. Briefly, the new method comprises first forming a polymeric aluminum alkoxide of a polyhydric alcohol, then subjecting the polyalkoxide to hydrolysis with water, thereby forming polymeric, hydrated aluminum oxide in the form of very small micelles, which gives upon drying and calcining an alumina gel having a very extended surface area. The aluminas so prepared are found to have a much higher surface area than those prepared under like conditions by hydrolysis of the aluminum alkoxides of monoalcohols.

The herein described polymeric aluminum alkoxides of polyhydric alcohols may also be designated for convenience as "polyesters" of aluminic acid, $H_3AlO_3$, and a polyhydric alcohol, by analogy to the esters of silicic acid. Both terms as used herein are intended to be synonymous.

The principal object of the invention is to provide convenient and inexpensive methods for preparing high surface area aluminas. A more specific object is to provide novel polymeric aluminum alkoxides which may be subjected to liquid phase hydrolysis to produce aluminas of high surface area, commensurate with those produced by the more expensive vapor phase hydrolysis of the aluminum alkoxides of mono-alcohols. Still other objects include the provision of methods which permit the attainment of highly active aluminas by hydrolysis of alkoxides at low temperatures, and without the necessity for elaborate distillation techniques to recover the liberated alcohol or alcohols. Other objects will be apparent from the following description of the invention.

Synthetic alumina is generally prepared by adding an alkali to an aqueous solution of an aluminum salt, or by adding an acid to aqueous sodium aluminate. The resulting hydrous oxide gels are then removed by filtration, dried and calcined. The surface area of the resulting xerogels generally runs between about 100 and 275 square meters per gram. Products in the higher surface area range are obtained by rapid drying at high temperatures and low pressures, but when high surface areas are so produced, the average pore diameter and pore volume is reduced, which is undesirable from the standpoint of selectivity of the resulting catalysts. For catalytic purposes, it is desirable that the catalyst should have both a high surface area, and fairly large average pore diameters and pore volumes. To achieve these dual objectives, several other synthetic methods have been proposed. One of these consists in preparing an aluminum alkoxide, as by dissolving aluminum metal in a monohydric alcohol, then hydrolyzing the alkoxide. When the hydrolysis is carried out in liquid phase a product of relatively low surface area and activity is generally obtained, if conventional calcining procedures are employed. A product of higher surface area is obtained if, as described in U.S. Patent No. 2,749,216, the aluminum alcoholate is sprayed into a stream of steam whereby immediate hydrolysis takes place coincident with the removal by vaporization of the alcohol produced. However this process is expensive and requires elaborate equipment and careful control.

I have now discovered that a product superior to that produced by the high-temperature vapor phase hydrolysis of the aluminum alkoxides of mono-alcohols may be obtained by the low-temperature, liquid-phase hydrolysis of the polymeric aluminum alkoxides of polyhydric alcohols. The polyhydric alcohol displaced by hydrolysis may be readily recovered by filtering, settling or centrifuging to separate the hydrous alumina gel from the reaction slurry. The high surface area of the resulting alumina gel after calcining is presumably due to the extended network structure of the polymeric alkoxide, which upon hydrolysis appears to produce very small micelles of hydrated alumina forming an interlacing gel network. The hydrated gel may then be dried by known methods in such manner as to control the average pore diameter within the desired range.

The polymeric alkoxides of polyhydric alcohols must generally be prepared by indirect methods, since under normal conditions aluminum metal does not react with polyhydric alcohols. Presumably a coating of polymeric alkoxide is formed on the surface of the metal which prevents further reaction. However, aluminum metal will react readily with anhydrous monohydric alcohols, e.g., methanol, ethanol, propanol, isopropanol, butanol, pentanol, hexanol, etc., to form the corresponding trialkoxide. In most instances, a small amount of catalyst is beneficial in hastening the reaction. Suitable catalysts include mercuric salts, iodine, carbon tetrachloride, etc. The resulting trialkoxides are soluble in alcohol, and the desired polymeric alkoxide may be quantitatively produced by adding to such alcoholic solutions, or to the pure trialkoxide, a stoichiometric proportion of the desired polyhydric alcohol. Temperatures between 0° and 250° C. may be employed. Ordinary room temperatures are usually suitable. The reaction is presumed to proceed as follows when aluminum ethoxide is reacted with ethylene glycol:

$2nAl(OC_2H_5)_3 + 3nHOCH_2CH_2OH \rightarrow$
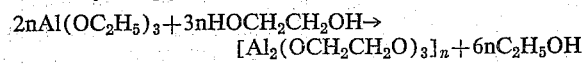
$[Al_2(OCH_2CH_2O)_3]_n + 6nC_2H_5OH$ In using other polyhydric alcohols, the mole-proportions should be adjusted so as to provide at least three moles of hydroxyl groups per mole of aluminum trialkoxide. Glycerol for example may be used in equimole ratios with the trialkoxide.

In most cases, the polymeric alkoxide is precipitated as an amorphous white solid which is infusible and insoluble in substantially all organic solvents. The solid polymer may then be separated by filtration or settling and subsequently hydrolyzed, or water may be added directly to the reaction slurry to effect hydrolysis. In the latter case, the polymer is immediately hydrolyzed to the desired hydrous alumina, as evidenced by the exothermic heat of reaction, and upon filtration, the filtrate of monohydric alcohol and polyhydric alcohol in any excess water is recovered and may be resolved by distillation into the separate components for reuse.

Alternatively, the polymeric alkoxide may be prepared by reacting an aluminum salt with the polyhydric alcohol under anhydrous conditions, preferably with continuous removal of the evolved acid. Ordinarily, this reaction takes place satisfactorily at room temperature, but in some cases, reduced or elevated temperatures may be desirable, ranging from about 0° to 200° C. The reaction is illustrated as follows:

$2nAlCl_3 + 3nHOCH_2CH_2OH \rightarrow$
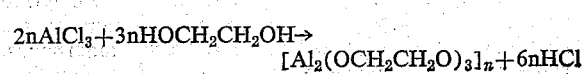
$[Al_2(OCH_2CH_2O)_3]_n + 6nHCl$ The polyhydric alcohols employed herein may comprise any of the aliphatic or cycloaliphatic polyhydroxy compounds, containing from 2 to about 20 carbon atoms, and from 2 to about 6 hydroxyl groups. This includes in general the glycols, polyglycols, glycerol, glycerol monoethers, erythritol, erythritol ethers, pentaerythritol, pentaerythritol ethers, mannitol, mannitol ethers, sorbitol, sorbitol ethers, and the like. Suitable examples include ethylene glycol, 1,2-propylene glycol, 1,3-propylene glycol, 1,2-butylene glycol, 1,3-butylene glycol, 1,4-butylene glycol, the dihydroxy pentanes and hexanes, 1,4-cyclohexanediol, 1,3-cyclohexanediol, 1,2-cyclohexanediol, d-quercitol, i-inositol, diethylene glycol, triethylene glycol, tetraethylene glycol, di-1,2-propylene glycol, di-1,3-propylene glycol, glycerol monomethyl ether, glycerol monoethyl ether, glycerol monododecyl ether, etc. The preferred group of compounds are the lower polyhydroxy alkanes containing from 2 to 6 carbon atoms and from 2 to 4 hydroxyl groups. These preferred compounds yield extremely high molecular weight solid polyalkoxides, as evidenced by their infusibility and substantially complete insolubility in all ordinary solvents. Polyhydroxy compounds containing an ether linkage sometimes yield viscous liquid alkoxides of lower molecular weight, as evidenced by their solubility in alcohols. These liquid polymers may however be hydrolyzed to yield aluminas of higher surface area than is readily obtainable by aqueous precipitation of inorganic aluminum salts.

Following hydrolysis of the aluminum polyester, the resulting alumina hydrogel may be washed and treated by conventional drying and calcining techniques. Ordinarily, a simple water wash is adequate to remove the excess alcohol, and since the process starts with substantially pure aluminum metal, there is ordinarily no problem of removing contaminating cations. The washed gel is then dried at low temperatures (e.g., 75–250° C.) in steam or air to remove the bulk of the water, and then calcined for 2–48 hours at 400°–1000° C. in steam or air to activate the alumina.

The calcined alumina is then suitable for use as an adsorbent, or may be pressed into tablet form and impregnated with aqueous solutions of various metal salts, e.g. cobalt nitrate, nickel nitrate, ammonium molybdate, chloroplatinic acid, etc., and again calcined to form highly active catalysts useful in various hydrocarbon conversions such as reforming, desulfurization, denitrogenation, isomerization, and the like.

The following examples are cited as illustrative modifications of the invention, but are not intended to be limiting in scope.

*Example I*

A solution of aluminum tri-isopropoxide in excess isopropyl alcohol was prepared by dissolving metallic aluminum shavings in anhydrous isopropanol at room temperature, and in the presence of a trace of mercuric chloride.

To one portion of this solution was added at room temperature, sufficient water to complete the precipitation of hydrous alumina gel. The resulting slurry was filtered, dried in air at 180° F. for 16 hours and calcined in air at 700° F. for 2 hours at atmospheric pressure. The surface area, as measured by standard nitrogen adsorption techniques, was 236 square meters per gram.

*Example II*

Two hundred and four grams of pure aluminum tri-isopropoxide was dissolved in 300 ml. of anhydrous isopropyl alcohol. To this solution was added, dropwise with stirring at room temperature, 95 ml. of dry ethylene glycol. Immediate and complete precipitation of the aluminum polyester occurred as a heavy, amorphous, white solid. The polyester was recovered by filtration, and was found to decompose before melting, and was insoluble in glycol, isopropyl alcohol and benzene.

A portion of the solid aluminum polyester was then stirred into an excess of water at room temperature to effect hydrolysis. The resulting slurry was filtered, washed free of alcohols, dried and calcined as described in Example I. The resulting calcined, gamma-type alumina had a surface area of 441 square meters per gram.

*Example III*

Another sample of the aluminum polyester of ethylene glycol prepared in Example II was hydrolyzed by agitation with excess water at room temperature, and the slurry was filtered and washed free of alcohols. The filter-cake was dried under vacuum at room temperature for 16 hours and then calcined under vacuum at 700° F. for 2 hours. The surface area of this product was found to be 507 square meters per gram. This example shows that calcining under reduced pressures gives a still further increase in surface area and hence activity.

*Example IV*

An isopropyl alcohol solution of aluminum tri-isopropoxide, prepared as outlined in Example I, was hydrolyzed in the liquid phase by the addition of an excess of water. The gelatinous slurry was filtered, and the filter-cake dried and calcined under vacuum as described in Example III. The surface area of this product was 324 square meters per gram, showing that the results of Examples II and III cannot be duplicated even by low pressure calcining of the hydrous aluminas prepared from monomeric aluminum trialkoxides.

*Example V*

When Example III is repeated using molar equivalents of 1,2-propylene glycol, 1,3-propylene glycol, or glycerol in place of the ethylene glycol, the corresponding polyesters are obtained, and are indistinguishable in physical appearance, melting point, and solubility characteristics from the ethylene glycol polyester. The aluminas obtained by hydrolysis and vacuum calcination under the conditions of Example III all display high surface areas, far in excess of that obtainable under like conditions by direct hydrolysis of the tri-isopropoxide.

*Example VI*

One hundred grams of aluminum tri-isopropoxide was dissolved in 200 ml. of dry isopropyl alcohol, and 71 ml. of dry diethylene glycol was stirred in slowly. No precipitation occurred, but the solution became very warm, indicating that the alcoholysis reaction was proceeding rapidly. The resulting solution was evaporated to recover all excess isopropanol, and the residue was a viscous liquid consisting of the polymeric aluminum polyester of diethylene glycol.

The viscous liquid was then redissolved in isopropanol and 55 ml. of water was added, resulting in the precipitation of gelatinous hydrous alumina, which was recovered by filtration. The filter cake was then dried and calcined under vacuum at 662° F. for 2 hours. The surface area of the resulting product was 366 square meters per gram.

*Example VII*

A portion of the calcined alumina from Example II was compressed into ⅛" pellets and impregnated with an aqueous solution of chloroplatinic acid, drained and sulfided with $H_2S$, and finally calcined under hydrogen at 900° F. for 5 hours. The resulting catalyst, containing about 0.6% by weight of platinum was found to have a surface area of 346 square meters per gram, and a pore volume of 0.51 ml./gm.

When this catalyst is employed for hydroforming a full-range, straight-run naphthenic gasoline at 900° F., 400 p.s.i.g., 1 liquid hourly space velocity, and with 4000 s.c.f. of hydrogen per barrel of feed, an improved product distribution is observed at octane-improvement levels identical to those obtained when using a conventional 0.6% Pt-alumina catalyst based on $CO_2$-precipitated alumina from sodium aluminate. This clearly indicates a highly selective activity for dehydrogenation and isomerization as opposed to cracking.

*Example VIII*

Another portion of the 0.6% platinum-alumina catalyst of Example VII was tested for the isomerization of n-pentane under the following conditions:

| | |
|---|---|
| Temperature °F | 850 |
| Pressure p.s.i.g | 500 |
| LHSV | 5.0 |
| $H_2$/pentane s.c.f./bbl | 1000 |

The liquid product contained 42.4% isopentane and 53.8% unconverted n-pentane, corresponding to a conversion selectivity of 92%.

$$\left(\text{Selectivity} = \frac{\text{percent of feed converted to isopentane}}{100 - \text{percent of feed not converted}} \times 100\right)$$

A commercial platinum on fluorided alumina catalyst, under the same isomerization conditions, produced 45.6% isopentane and 49.3% unconverted n-pentane. This shows a selectivity of isopentane production of 90%, and also shows that the un-fluorided alumina of Example II is substantially as effective in isomerization catalysts as a commercial fluorided alumina.

Another catalyst comprising 0.60% platinum on a conventional type pure alumina prepared by the hydrolysis of pure aluminum isopropylate was tested under the same conditions. The product contained 28.5% isopentane and 65.8% unconverted n-pentane, corresponding to a selectivity of 83%.

This example clearly shows the unusally high acidic properties of the alumina prepared by hydrolysis of an aluminum polyester of the type described.

It is not intended that the invention should be restricted to the details disclosed in the foregoing examples or elsewhere herein, since many variations may be made by those skilled in the art without departing from the scope or spirit of the following claims, which are intended to delineate the true scope of the invention.

I, therefore, particularly point out and distinctly claim as my invention:

1. A method for preparing high-surface-area alumina gels, which comprises hydrolyzing an aluminum polyester of a polyhydric alcohol to obtain a hydrous alumina gel and to regenerate said polyhydric alcohol, then drying and calcining the resulting hydrous gel, said polyhydric alcohol being selected from the class consisting of aliphatic and cycloaliphatic polyhydroxy compounds containing from 2 to 20 carbon atoms and from 2 to 6 hydroxyl groups.

2. A method as defined in claim 1 wherein said polyhydric alcohol is a lower polyhydroxy alkane containing from 2 to 6 carbon atoms and from 2 to 4 hydroxyl groups.

3. A method as defined in claim 1 wherein said polyhydric alcohol is a lower alkylene glycol.

4. A method as defined in claim 1 wherein said polyhydric alcohol is a lower polyoxyalkylene glycol.

5. A method as defined in claim 1 wherein said polyhydric alcohol is ethylene glycol.

6. A method for preparing a high-surface-area alumina xerogel which comprises first reacting an aluminum alkoxide of a monohydric alcohol with a polyhydric alcohol to thereby form an aluminum polyester of said polyhydric alcohol, then subjecting said aluminum polyester to hydrolysis to obtain a hydrous alumina gel and drying and calcining said hydrous gel, said polyhydric alcohol being selected from the class consisting of aliphatic and cycloaliphatic polyhydroxy compounds containing from 2 to 20 carbon atoms and from 2 to 6 hydroxyl groups.

References Cited in the file of this patent

UNITED STATES PATENTS

| | | |
|---|---|---|
| 2,519,622 | Archibald et al. | Aug. 22, 1950 |
| 2,735,858 | Bergman | Feb. 21, 1956 |
| 2,749,216 | Dinwiddie et al. | June 5, 1956 |
| 2,768,960 | Van Winkle et al. | Oct. 30, 1956 |
| 2,773,842 | Kimberlin et al. | Dec. 11, 1956 |
| 2,776,188 | Gilbert | Jan. 1, 1957 |
| 2,838,375 | Teter et al. | June 10, 1958 |
| 2,838,444 | Teter et al. | June 10, 1958 |